US007843322B2

(12) United States Patent
Zakrewski et al.

(10) Patent No.: US 7,843,322 B2
(45) Date of Patent: Nov. 30, 2010

(54) INSTANT MESSAGING APPLICATIONS IN SECURITY SYSTEMS

(75) Inventors: David S Zakrewski, Babyon, NY (US); William R Blum, Huntington Station, NY (US); Kenneth L Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 304 days.

(21) Appl. No.: 12/025,869

(22) Filed: Feb. 5, 2008

(65) Prior Publication Data

US 2010/0030856 A1  Feb. 4, 2010

Related U.S. Application Data

(63) Continuation-in-part of application No. 11/837,257, filed on Aug. 10, 2007, now Pat. No. 7,746,224.

(60) Provisional application No. 60/917,996, filed on May 15, 2007, provisional application No. 60/822,369, filed on Aug. 14, 2006.

(51) Int. Cl.
   G08B 29/00  (2006.01)
   H04L 12/58  (2006.01)
   H04M 1/725  (2006.01)
   G06F 3/00   (2006.01)
   G06F 9/44   (2006.01)
   G06F 9/46   (2006.01)
   G06F 13/00  (2006.01)

(52) U.S. Cl. ................. 340/506; 455/412.2; 719/318

(58) Field of Classification Search ......... 340/506–513, 340/426.15, 539.14, 539.16–539.2; 455/404.1, 455/404.2, 507, 521; 719/318
See application file for complete search history.

(56) References Cited

U.S. PATENT DOCUMENTS

| 6,914,519 | B2* | 7/2005 | Beyda ................ 340/286.02 |
|---|---|---|---|
| 7,292,870 | B2* | 11/2007 | Heredia et al. ............ 455/466 |
| 7,729,705 | B2* | 6/2010 | Jung et al. ............. 455/456.1 |
| 2003/0117280 | A1* | 6/2003 | Prehn ................... 340/540 |
| 2003/0129969 | A1* | 7/2003 | Rucinski ................ 455/412 |
| 2004/0205775 | A1* | 10/2004 | Heikes et al. ............ 719/318 |
| 2005/0111653 | A1* | 5/2005 | Joyce et al. ........... 379/265.09 |
| 2005/0135333 | A1* | 6/2005 | Rojas .................... 370/352 |
| 2006/0015452 | A1* | 1/2006 | Kulasooriya et al. ........ 705/39 |
| 2006/0186986 | A1* | 8/2006 | Ma et al. ................ 340/3.9 |
| 2007/0226182 | A1* | 9/2007 | Sobotka et al. ............ 707/3 |
| 2008/0068150 | A1* | 3/2008 | Nguyen et al. ............ 340/506 |

* cited by examiner

*Primary Examiner*—Jennifer Mehmood
(74) *Attorney, Agent, or Firm*—Barkume & Associates, P.C.

(57) ABSTRACT

A method of operating a security system by generating an instant message at a first location, the instant message including security system data, then transmitting the instant message from the first location over a computer network to a second location via an instant message server computer. The instant message is received at the second location, and a security system function is initiated at the second location based on the security system data from the instant message. Security system configuration data may be provided with an instant message in order to enable remote programming of the security system via the instant messaging channel. Half-duplex audio communications may also be achieved by providing digitized audio files with instant messages that may be communicated between locations.

2 Claims, 2 Drawing Sheets

INSTANT MESSAGING APPLICATIONS IN SECURITY SYSTEMS

CROSS-REFERENCE TO RELATED APPLICATIONS

This application is a continuation-in-part application of U.S. application Ser. No. 11/837,257 (U.S. Pat. No. 7,746,224, issued on Jun. 29, 2010 ) filed Aug. 10, 2007 entitled INSTANT MESSAGING APPLICATIONS IN SECURITY SYSTEMS, which claims priority from U.S. application Ser. No. 60/822,369, filed on Aug. 14, 2006 and entitled INSTANT MESSAGING APPLICATIONS IN SECURITY SYSTEMS and U.S. application Ser. No. 60/917,996, filed on May 15, 2007 and entitled INSTANT MESSAGING APPLICATIONS WITH ATTACHMENTS IN SECURITY SYSTEMS.

TECHNICAL FIELD

The present invention relates to the use of instant messaging protocols and systems in security systems.

BACKGROUND ART

In the security and alarm industry, communications between various and remotely located facilities are of utmost importance. In particular, a premises under surveillance such as a home or commercial building being monitored by a security system, often will need to communicate with a central station monitoring facility. When an alarm condition occurs, such as when the premises is breached or when a fire or smoke condition is detected, then an alarm signal must be transmitted to the central station in a secure, timely, and robust manner. In addition to sending messages out of the security system, it is often desired to be able to send messages into the security system, such as when a central station operator requests status from a particular security system (e.g. to confirm an alarm message). Also, it may be desired to effect control of the security system remotely in addition to obtaining status, such as when the homeowner wishes to operate the security system from a different location such as his office, etc.

In the prior art, communications have been primarily made via the telephone network (POTS—plain old telephone system). The telephone system has been advantageous due to its ubiquity—just about all homes and commercial buildings have telephone network connections in place that are easily adapted for use by the security system to "dial up" the central station. Other means of communications have included radio communications such as the ADEMCO ALARMNET service, which provides a redundant communications path in the event the telephone network fails or is sabotaged. Various technologies have been used for the wireless communications, including cellular technologies.

The Internet is a relatively new communications backbone that provides communications between multiple points using TCP/IP (transmission control protocol/internet protocol). The Internet Protocol (IP) may be advantageously used to provide each node with an IP address, which is used to establish a communication session. This technology is well known in the art and need not be fully discussed herein.

A relatively recent application of IP and the Internet is instant messaging (IM). IM provides real-time communications between parties (as opposed to the slower means of email) since a session that is established through an IM server allows text to be typed at one IM client and sent immediately for display at the recipient IM client. In addition, files may be transferred and real-time video and/or audio communications may be effected.

The present invention implements the use of instant messaging in new ways in the security field to provide real-time, secure and robust communications between multiple parties as described herein.

DISCLOSURE OF THE INVENTION

The present invention is a method of operating a security system by generating an instant message at a first location, the instant message including security system configuration data, then transmitting the instant message from the first location over a computer network to a second location via an instant message server computer. The instant message is received at the second location, and a security system device is programmed at the second location with the security system configuration data from the instant message.

For example, configuration data may include but is not limited to any or all of the following: user information, scheduling information, entry/exit times, additional keyfob identification information, deletion of zones, setting of macros, and the like.

The security system communications system of this invention includes an instant messaging server interconnected to a computer network, a central station operator computer at a first location and interconnected to the computer network, and a premises monitoring system at a second location. The premises monitoring system includes a plurality of security system devices (i.e. alarm sensors), each adapted to monitor a condition at the second location; a control panel interconnected to the plurality of security system devices for communication therewith; an instant messaging client adapter interconnected with the control panel and the computer network, and processing circuitry adapted to program a security system device with security system configuration data from the instant message received from the central station operator computer.

A further aspect of this invention is a method of providing half-duplex audio communications between parties via a security system including generating an instant message having digitized audio information from a first party; transmitting the instant message from a first location over a computer network to a second location via an instant message server computer; receiving the instant message at the second location; and playing the digitized audio information from the received instant message over a speaker to a second party at the second location.

BEST MODE FOR CARRYING OUT THE INVENTION

Figure 1:
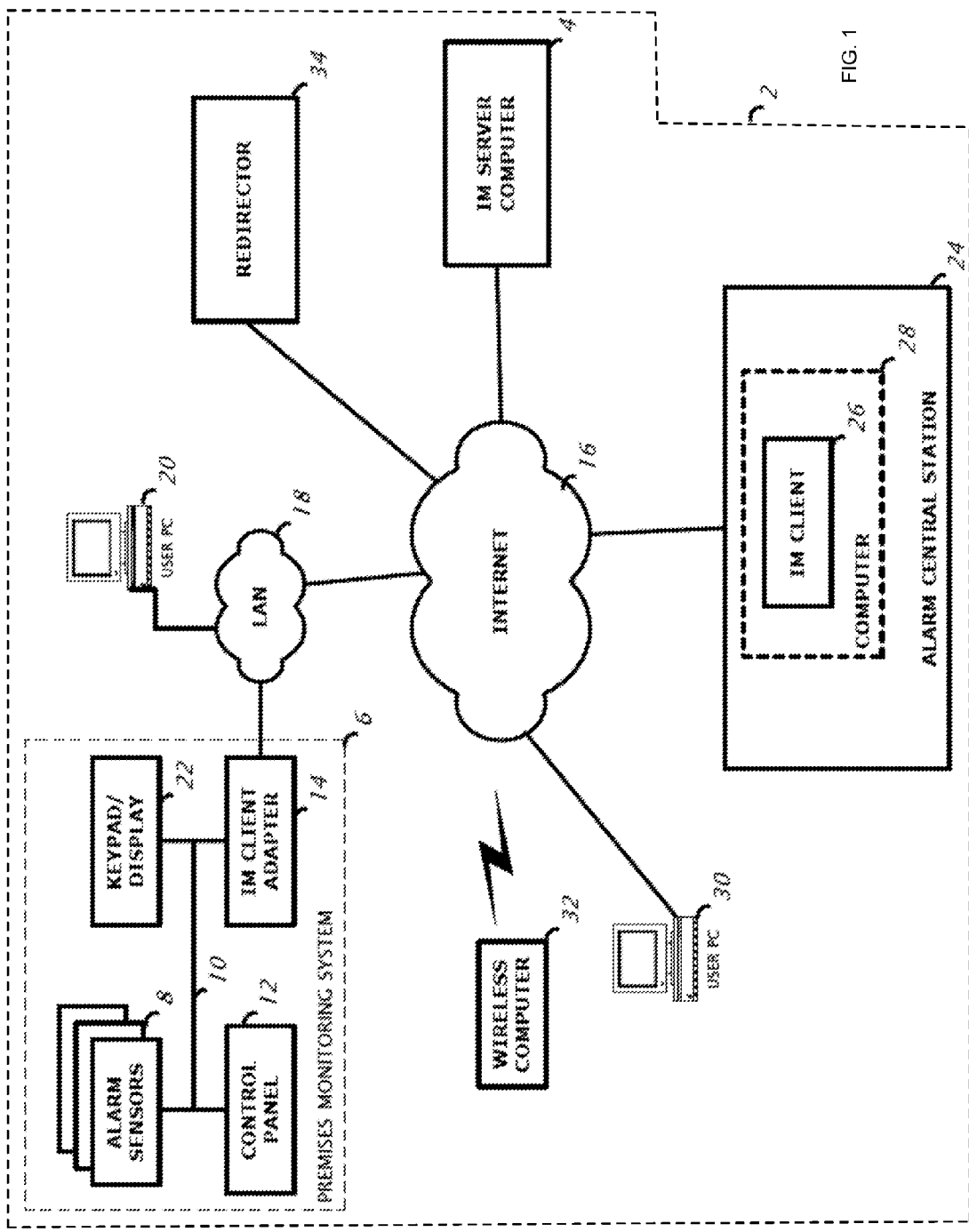
FIG. 1 is a block diagram of a preferred embodiment of the present invention.

The preferred embodiments of the present invention will now be described with respect to the Figures. In the security system 2 of the present invention, as shown in FIG. 1, use is made of an instant messaging (IM) server computer 4 to provide the features as desired. As known in the art, the IM server, such as one provided by YAHOO or AMERICA ONLINE, manages real-time communications between clients. In addition to using a commercially available IM service, the present invention may be adapted to implement a private IM server whose primary function is to manage communications between security clients as further described herein.

In a first embodiment of the present invention, a security system 2 includes a premises monitoring system 6 that monitors a building such as a home is configured as known in the art, e.g. with alarm sensors 8 (PIR detectors, smoke detectors, glass breakage detectors, window and door intrusion detectors, etc) that are interconnected via a security system bus 10 with a control panel 12. Integral with the control panel 12, or as a separate component (as shown in FIG. 1), is an instant messaging client adapter 14, which includes hardware and software adapted to enable communications over a network such as the Internet 16 via a hardwired or wireless embodiment. For example, a hardwired interface will enable the IM client adapter 14 to interconnect directly with a local area network (LAN) 18 at the premises such that the IM client adapter 14 may communicate via the LAN 18 with the Internet 16 as would any other device interconnected to the LAN (such as a computer 20). In the alternative, the IM client adapter 14 may interconnect with the LAN 18 via a WI-FI wireless 802.11 protocol as known in the art, or it may have a direct wireless (e.g. cellular) connection as known in the art.

The premises monitoring system 6 will also implement a monitor, such as a panel display 22 or the like, which will function to display the IM messages for viewing by the user (a building manager, homeowner, etc.). The premises monitoring system 6 will also have an input device such as a keyboard or keypad that will enable the user to enter IM messages as further described. The display and keyboard may be already existing as part of the premises monitoring system 6 (see keypad/display 22), in which case they will be adapted to interoperate with the IM client adapter as required (i.e. display IM messages and allow responses to be entered). In the alternative, a separate keyboard and display may be integral with the IM client adapter. In a further alternative embodiment, a personal computer 20 adapted in accordance with this invention may be used.

The central station monitoring service 24 is also adapted to implement an IM client 26, which will in a preferred embodiment be a known IM client executing on a computer such as a personal computer 28 running an operating systems such as WINDOWS, MAC OSX, or the like. The IM client 26 at the central station monitor 24 may be especially adapted to interoperate with the monitoring software executing on the computer 28 as further described.

Both the IM client 26 executing at the central station monitor 24 and the IM client adapter 14 at the premises monitoring system 6 will be registered with the IM server 4 as users, and be given unique user names and passwords a well known in the art. Each IM client 14, 26 may then set up a user list ("Buddy List") that includes the other clients, and that enables ease of communications as known in the IM field.

In one embodiment, the central station operator 24 may use the present invention to send an instant message to the IM client adapter 14 at the premises monitoring system 6 via the IM server 4 as well known in the art. The instant message is received by the IM client adapter 14 at the premises monitoring system 6 and either automatically or manually responded to.

For example, in one case, the central station operator 24 may send an IM that requests status of the premises monitoring system 6. The status request may be automatically translated/interpreted by the IM client adapter 14 into machine language understandable by the control panel 12, and the requested status information is automatically sent back to the central station as a status response. This information may be reviewed for subsequent action, archived, and the like.

In another example, the IM messaging may be used for false alarm verification. Currently, verification of alarm messages sent to a central station occur by a two way audio conversation between a central station operator and a person at the premises. When an alarm signal is received by the central station operator, he may ask the homeowner, via audio means, for identification, a secret password, etc. The use of a speaker and microphone in this system make some people uncomfortable and therefore the present invention allows a central station operator to send an IM to the homeowner asking for verification and/or identification. The central station operator could type in a query (or select a preprogrammed message): PLEASE ENTER YOUR AUTHENTICATION INFORMATION . . . The user would then enter the required information and the parties could continue an IM conversation rather than using an audio system with a speaker and microphone.

In another example, an instant message may be automatically sent to the central station 24 via the IM server 4 on the occurrence of a certain condition, such as a perimeter breach (alarm signal), low battery condition of a smoke alarm, etc. The IM client adapter 14 and/or control panel 12 would automatically generate an appropriate message to send, such as BREACH OF REAR PORCH WINDOW. This message would appear on the screen of the central station operator 24 for subsequent action (such as verification, etc).

In a further embodiment, a user (homeowner) could have complete control over operation and status of the premises monitoring system 6 while away. For example, the user could use any Internet-based device, such as a laptop computer, cell phone, office PC 30, Internet-enabled PDA 32, etc. The premises monitoring system 6 would always be logged in to the IM server 4, and the user would send an appropriate instant message to the premises monitoring system 6 at home, such as SEND SYSTEM STATUS, DISARM, BYPASS ZONE 6, ARM AWAY, etc. The instant message would be sent via the IM server 4 to the premises monitoring system 6 and interpreted and acted upon by the IM client adapter 14 in conjunction with the control panel 12. If a response is required, then the IM client adapter 14 would send a responsive message.

In the above-described embodiments, the communications are advantageously made between the central station IM client software 26 and the client IM adapter 14 at the premises monitoring system 6. In this case, when the client IM adapter 14 logs into the IM server 4, the IP address of the adapter 14 will be known to the IM server 4. Since most homeowners have Internet access from a service provider that provides a dynamic IP address (i.e. one that changes periodically), it is important for the client IP adapter 14 to be logged in so the IM server 4 knows the IP address of the IM client adapter 14 at the required time. It is noted that, as a business, the central station 24 will likely have a static IP address assigned to it, which will not vary. However, even if it does vary, then the IM server 4 will know the current IP address of the central station IM client 26 and be able to communicate accordingly. Thus, in this embodiment, the IM server 4 acts as an intermediary between the IM clients, allowing real-time communications as described above. It is also noted that some versions of instant messaging provide the IM server 4 to hand off the session to the respective clients after they have been authenticated, and the real-time messages go directly between the clients with the IM server 4 stepping out of the communications sessions. The present invention operates in either embodiment of the IM server.

In a further embodiment, a redirector server 34 is also included in the communications path as shown in FIG. 1. The redirector server 34 will also have IM client software executing. When one of the parties (the premises monitoring system 6 or the central station 24) desires to IM the other, the message will also travel via the redirector 34. So, for example, when the central station wants to send an IM to the premises monitoring system 6, the IM will travel via the IM server 4 to the redirector 34, and then to the premises monitoring system 6. The redirector 34 may add a layer of encryption to the messages that provide increased security from eavesdroppers and hackers. In addition, the redirector 34 may provide a language translation function if desired. In this case, the user may enter an English language message such as ARM SYSTEM AWAY. This message would be received by the redirector 34 (via the IM server 4) and then translated from English to a machine language that has commands that the control panel 12 at the receiving premises monitoring system 6 would understand. This may be a hex or binary language for example. In the alternative, the language translation would have to be done at the control panel 12 or IM client adapter 14.

Figure 2:
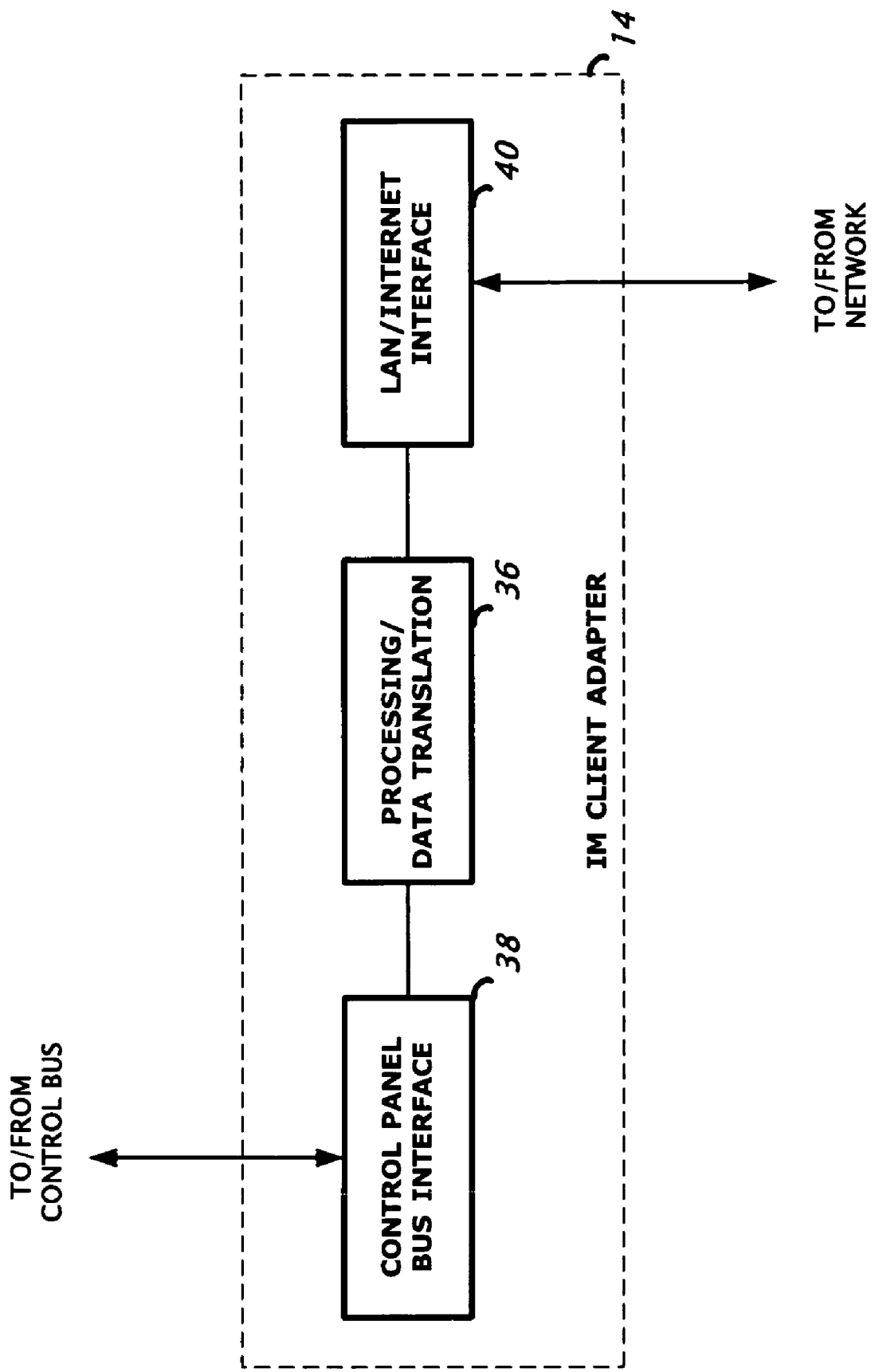
FIG. 2 is a block diagram of the IM client adapter of FIG. 1.

FIG. 2 illustrates the embodiment where the IM client adapter 14 performs the language translation functions. The adapter 14 will have a control panel bus interface 38, processing/data translation circuitry 36, and LAN/Internet interface 40. For example, a data packet(s) arrives from the LAN 18 that contains a security system text command such as "SEND SYSTEM STATUS" or "ARM SYSTEM AWAY". This is then acted on by the data translation processor 36 to generate a corresponding security system bus command, which is sent via the control panel bus interface 38 to the control bus 10 (and the control panel 12). The opposite situation also occurs when a security system bus command is sent from the control panel 12 over the control bus 10 to the control panel bus interface 38. Then, the security system bus command will be translated by data translation processing 36 into a security system text command such as "SYSTEM ARM CONFIRMED". This message is put into IP protocol and sent via the LAN/Internet interface 40 to the LAN 18, over the Internet 16 to the IM server 4, and then to the IM client 26 at the central station 24 (or other IM client as the case may be) where the SYSTEM ARM CONFIRMED message will be displayed.

The data translation may occur by using a lookup map or other function that can translate known text commands into the required bus command as required, and vice versa.

In a further embodiment, the present invention may be used to enable IM attachment files to be sent from the premises monitoring system 6 to the central station 24 or another IM client. For example, a video or audio attachment may be generated by the IM client adapter 14 and/or a computer 20 attached thereto. The premises monitoring system 6 captures pre-alarm and/or post alarm information, such as a video of the front entry way before and after a door is opened. This video or audio file is then sent as an attachment to an IM message sent from the premises monitoring system 6 to the central station 24 as known in the art. This would be useful in situation such as with latchkey children. For example, a 15 second video or audio file is captured before and/or after the door is opened, and then sent to the central station 24 with the IM message. The central station operator could then verify the identity of the person entering the door as the authorized person (child). This IM could also be sent directly to a computer 30 at which the homeowner is logged in. Thus, a parent at work would get an IM from the premises monitoring system 6 stating, "FRONT DOOR OPENED AT 3:15PM", with a video file showing who entered the front door or an audio file playing a message from that person. Action may be taken if necessary (for example if the video shows a danger situation such as a child being coerced to open the door by an intruder, etc.). As described, in addition to or in the alternative to using a video capture system, audio may also be captured and transmitted as an IM attachment as well.

In another further embodiment, IM attachments may be sent to the PM premises monitoring system 6. For example, a video file may be sent as an IM attachment that contains emergency warning information such as severe weather warnings (e.g. tornados). In this case, a video showing radar patterns and the like may be generated and sent as an IM message attachment to certain subscribers from the central station 24 or a related entity. The IM client adapter 14 would receive the attachment (the video file) and play it on an associated display 22 and/or speaker. This enables the central station 24 to communicate with specified premises monitoring systems in a real time manner and push information, in the form of video/audio attachments, to that particular system(s). Other types of information could include advertising messages, utility power warnings, and the like.

An audio attachment may also be generated and transmitted via this IM system, which may be used to provide a half-duplex audio conversation. That is, a short voice file may be generated and sent over the IM channel and played at the remote location to support half duplex voice communications to be used for two way voice services which can connect a central station operator with the end customer. For example, after the operator connects via IM to the protected premises, the person there (e.g. the homeowner) may in turn record some amount of audio sampled from a two way voice microphone and return it to the central station operator via IM for playback. Likewise, the central station operator could speak and record an audio message for transmission and playback at the protected premises. Control of this could be done either by a VOX circuit (voice activation) or via text IMs from the operator's console. Audio files may be requested by the central station operator and/or the homeowner could send the audio files to the central station operator without an initial request.

As a further embodiment, the present invention may be utilized to assist in the installation or configuration of the security system. During a typical security system installation process, the installer will install an off-the-shelf control panel and program it with various types of information, such as authorized user codes and passwords, alarm schedules, entry/exit times and the like. This information must be programmed on a case-by-case basis since it will of course vary for each installation. This is a time-consuming process and results in an increased installation cost. Under this invention, however, the system configuration information may be installed from a remote location via the IM protocols. This enables the system customization and installation costs to be reduced since the installer may now spend less time at the location.

For example, once the hardware has been installed at a location, the homeowner may initiate a configuration routine by sending an IM or other initiating signal (e.g. manual telephone call) to the remote installation center, such as the central station. The remote installation center may then send IM's back to that control panel, as described above, that includes the required configuration data. This may be sent within the body of the IM or as an attachment. In either case, the IM client at the installation site would receive the IM having the configuration data and use it to program the required users, schedules, etc. This eliminates the need for an installer to manually enter all of the configuration data from a work order as in the prior art.

Similarly, configuration data may be easily updated and modified through the IM service of this invention. For example, a homeowner may wish to change a password, add a user, etc. After consulting with the central station, the required configuration code information would then be transmitted via the IM service of this invention and installed accordingly at the location. Likewise, code updates such as firmware modifications may be made automatically by the system by having the central station (or installation service, manufacturer, etc.) send an IM having the updated firmware code directly to the location, where the system will recognize the IM as having code updates and update the flash memory accordingly. This methodology may be used to update or program other components of the security system as well.

Configuration data that may be transmitted via the IM methodology of the present invention and then used to re-program the security system control panel and/or device(s) at the premises may include but is not limited to any or all of the following: user information, scheduling information, entry/exit times, additional keyfob identification information, deletion of zones, setting of macros, and the like.

It will be apparent to those skilled in the art that modifications to the specific embodiment described herein may be made while still being within the spirit and scope of the present invention. For example, any short messaging service (SMS) data service that enables real-time communication between devices over a wide area network may be used, including IM as described as well as text messaging commonly used over cellular networks.

What is claimed is:

1. A method of providing half-duplex audio communications between parties via a security system comprising:
   a. generating an instant message comprising digitized audio information from a first party;
   b. transmitting the instant message from a first location over a computer network to a second location via an instant message server computer;
   c. receiving the instant message at the second location;
   d. playing the digitized audio information from the received instant message over a speaker to a second party at the second location;
   e. generating a response instant message comprising digitized audio information from the second party;
   f. transmitting the response instant message from the second location over a computer network to the first location via the instant message server computer;
   g. receiving the response instant message at the first location; and
   h. playing the digitized audio information from the received response instant message over a speaker to the first party.

2. A security system communications system comprising:
   a) an instant messaging server interconnected to a computer network;
   b) a central station operator computer at a first location and interconnected to the computer network, said central station operator computer comprising (i) a first audio input device for generating an instant message comprising a first audio file, (ii) transmission circuitry for transmitting the instant message over the computer network via the instant messaging server, and (iii) a first audio output device for playing a second audio file from a response instant message; and
   c) a premises monitoring system at a second location, comprising:
      a plurality of security system devices, each adapted to monitor a condition at the second location,
      a control panel interconnected to the plurality of security system devices for communication therewith,
      an instant messaging client adapter interconnected with the control panel and the computer network, for receiving the instant message via the instant messaging server,
      a second audio output device for playing the first audio file received as part of the instant message from the central station operator computer, and
      a second audio input device for enabling a user to generate the second audio file to be included in the response instant message for transmission over the computer network to the central station operator computer via the instant messaging server.

* * * * *